United States Patent [19]
Sandy et al.

[11] Patent Number: 5,927,646
[45] Date of Patent: Jul. 27, 1999

[54] ENERGY ABSORBING LANDING GEAR/ TAIL SKID INCLUDING MEANS FOR INDICATING THE MAGNITUDE OF IMPACT LOADS

[75] Inventors: David F. Sandy, West Haven; Kenneth M. Furnes, Monroe, both of Conn.

[73] Assignee: Sikorsky Aircraft Corporation, Stratford, Conn.

[21] Appl. No.: 08/612,947
[22] PCT Filed: Sep. 14, 1995
[86] PCT No.: PCT/US95/11599
 § 371 Date: Sep. 14, 1995
 § 102(e) Date: Sep. 14, 1995
[87] PCT Pub. No.: WO97/10145
 PCT Pub. Date: Mar. 20, 1997
[51] Int. Cl.$^6$ .............................. B64C 25/52; B64C 25/58
[52] U.S. Cl. ........................... 244/108; 244/109; 188/377
[58] Field of Search ..................... 244/108, 109; 188/377

[56] References Cited

U.S. PATENT DOCUMENTS

| | | | |
|---|---|---|---|
| 3,252,548 | 5/1966 | Pajak et al. | 188/377 |
| 3,265,163 | 8/1966 | Gilbert et al. | 188/377 |
| 3,493,082 | 2/1970 | Bell | 188/377 |
| 3,730,306 | 5/1973 | Rath | 188/345 |
| 3,990,816 | 11/1976 | Kohler et al. | 417/536 |
| 4,336,868 | 6/1982 | Wilson et al. . | |
| 4,558,837 | 12/1985 | Mens et al. | 244/108 |
| 4,679,429 | 7/1987 | Merten et al. | 73/168 |
| 4,768,460 | 9/1988 | Soon-Fu | 116/266 |
| 4,815,678 | 3/1989 | Gawne | 244/109 |

FOREIGN PATENT DOCUMENTS 1105044  3/1968  United Kingdom .

*Primary Examiner*—Charles T. Jordan
*Assistant Examiner*—Christopher K. Montgomery
*Attorney, Agent, or Firm*—Brian A. Collins

[57] ABSTRACT

A landing gear/tail skid having at least two pivot axes (22, 24) which are subject to relative motion in response to impact loads acting on the landing gear/tail skid (10) and a contact arm (18) disposed in combination with pivot axes (22, 24). The cartridge assembly (20) includes a housing member (30) having and internal chamber (38) and a telescoping piston assembly (40) mounting within the internal chamber (38) wherein the end portions of each are disposed in combination with one of the pivot axes (22, 24). The housing member (30) and piston assembly (40), in combination, define opposed bearing surfaces (36s, 46s) which act on an energy absorbing means (50) disposed within the internal chamber (38) and intermediate the opposed bearing surfaces (36s, 46s). The energy absorbing means (50) is operative, in response to impact loads coupled thereto by the opposed bearing surfaces (36s, 46s), to react impact loads below a threshold is value without change in its critical dimension ($L_c$) and is further operative to absorb and dissipate energy of impact loads at least equal to the threshold value by changes in its critical dimension ($L_c$). The contact arm (20) further includes an indication means (60) for visually indicating changes to the critical dimension ($L_c$) of the energy absorbing means (50) wherein the changes are indicative of the magnitude of the impact loads acting on the landing gear/tail skid (10).

9 Claims, 3 Drawing Sheets

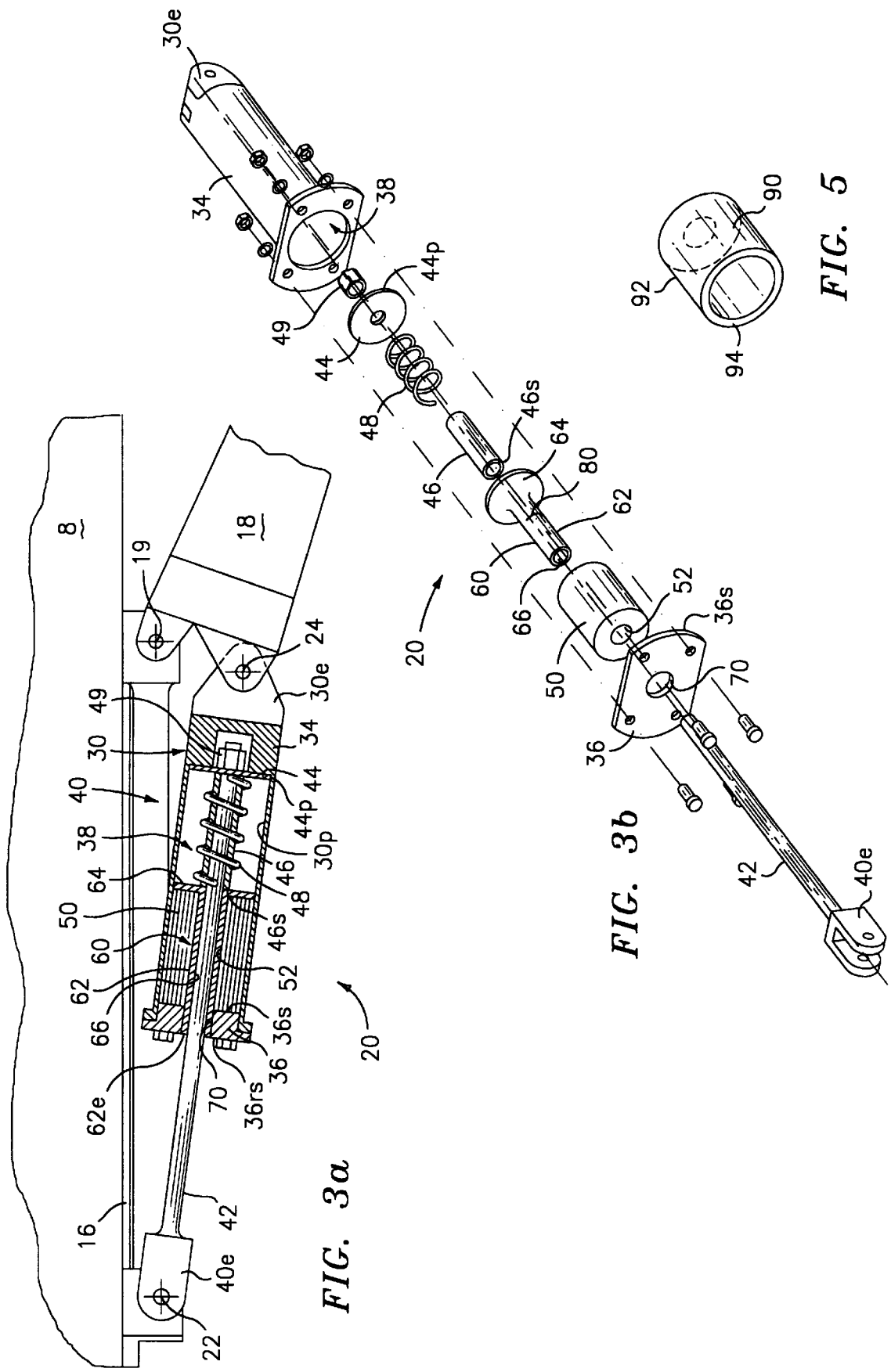

ENERGY ABSORBING LANDING GEAR/TAIL SKID INCLUDING MEANS FOR INDICATING THE MAGNITUDE OF IMPACT LOADS

TECHNICAL FIELD

This invention relates to landing gear/tail skids, and, more particularly, to a landing gear/tail skid for protecting the tail section of an aircraft, and, more particularly, to a landing gear/tail skid which s provides a visual indication of the magnitude of impact loads applied thereto, and, consequently, to the adjoining aircraft tail section.

BACKGROUND OF THE INVENTION

Landing gear are well known in the art for abating structural damage to the adjoining aircraft structure, i.e., fuselage structure. Common varieties of landing gear include energy absorbing and skid landing gear types wherein energy absorbing landing gears dissipate a large portion of the aircraft's inertial energy upon ground contact and wherein skid landing gears transfer load directly into the structural members of the fuselage, i.e., bulkheads, longerons and stringers, such that energy is dissipated via elastic deformation of the skid landing gear and the adjoining fuselage structure. Energy absorbing landing gear typically comprise a complex assemblage of moving parts including a telescoping damping strut (commonly referred to as an oleo strut), which dissipates energy by shuttling fluid through a damping orifice as the landing gear is exercised, i.e., upon ground contact. Skid landing gear typically include a simple framework of tubular members or rails, which are hard mounted to the fuselage structure and which serve as a simple contact surface for arresting the motion of and supporting the aircraft upon landing.

Within the family of skid landing gear are tail skids which are mounted to the undercarriage of the aircraft's tail section to protect the same in the event of incidental contact. Tail skids typically comprise a simple beam member which is cantilever mounted to the tail section and which functions as a conventional bumper assembly.

Common applications for landing gear and/or tail skids include the tail pylon of rotorcraft, which may require support and/or protection due to the attendant weight of the overhead tail rotor/gearbox assembly and the inherent vulnerability of the tail pylon to ground strikes. With regard to the latter, the landing gear/tail skid protects the tail pylon upon landing, and, more importantly, during flared, i.e., nose-up, landing approaches wherein the tail pylon is proximal to the landing surface.

Depending upon the anticipated mission of the rotorcraft, the size, and consequently, the weight of the tail pylon and/or associated landing gear may vary significantly. For example, military rotorcraft may require structural augmentation of the tail pylon, and/or the use of a high durability landing gear to withstand landing maneuvers on rough, unprepared terrain, or survive in a more aggressive operating environment, e.g., battlefield maneuvers. Generally, energy absorbing landing gear are employed in such applications to mitigate the potential damaging effects of the anticipated high impact loads. Such energy absorbing landing gear provide a full range of protection and are designed for repetitive use.

Civil rotorcraft, on the other hand, operate in a more benign environment, and may not require structural augmentation to withstand the anticipated (lower) impact loads. Skid landing gear/tail skids may be utilized for such applications, insofar as the fuselage structure itself may be suitably designed to withstand such impact loads. Generally, skid landing gear/tail skids provide a marginal level of protection insofar as the need, i.e., mission, does not require the level of protection afforded by energy absorbing landing gear.

While it is desirable to design the tail pylon and its associated landing gear/tail skid to meet specific mission requirements, e.g., for optimizing weight, fuel efficiency and handling qualities, the practicalities of manufacturing several variants of the same aircraft configuration necessitate that certain compromises be made. By producing variants with slightly altered thickness dimensions to strengthen or lighten the structure, the manufacturer incurs additional costs associated with non-recurring engineering, tooling expenses, increased inventory, and consequently, increased overhead expenses. If the burden of such costs are not outweighed by the benefits of improved aircraft performance, or if the customer is unwilling to pay a higher price, then a decision is made to target a specific mission requirement. Typically, the design which satisfies the greatest number of requirements and largest customer base, is selected. Accordingly, the design is optimum for one select group of customers and non-optimum for all others.

A need therefore exists to provide a landing gear/tail skid which satisfies a wide spectrum of mission requirements thereby appealing to a s broader customer base.

SUMMARY OF THE INVENTION

It is an object of the invention to provide a landing gear/tail skid which protects and limits the impact loads acting on the tail section of an aircraft while furthermore reducing the weight thereof.

It is another object of the invention to provide a landing gear/tail skid which is operative to react impact loads acting on the aircraft tail section and/or absorb and dissipate energy associated therewith.

It is yet a further object of the invention to provide a landing gear/tail skid which provides a visual indication of the magnitude of impact loads acting on the landing gear/tail skid, and, consequently, on the aircraft tail section.

These and other objects are achieved by a landing gear/tail skid having at least two pivot axes which are subject to relative motion in response to impact loads acting on the landing gear/tail skid and a cartridge assembly mounting between and in combination with the pivot axes. The cartridge assembly comprises a housing member having an internal chamber and an end portion disposed in combination with one of the pivot axes, and, a telescoping piston assembly mounted within the internal chamber of the housing member and having an end portion disposed in combination with the other of the pivot axes. The housing member and telescoping piston assembly, in combination, define opposed bearing surfaces which are coupled to and act on an energy absorbing means which is disposed within the internal chamber intermediate the opposed bearing surfaces. The energy absorbing means is operative, in response to impact loads coupled thereto by the opposed bearing surfaces, to react impact loads below a threshold value without change to a critical dimension defined by the energy absorbing means. The energy absorbing means is further operative, in response to impact loads coupled thereto by the opposed bearing surfaces, to absorb and dissipate the energy of impact loads at least equal to the threshold value by changes in the critical dimension. An indication means is also provided for visually indicating changes in the critical dimension of the energy absorbing means. The changes in the critical dimension are indicative of the magnitude of the impact loads acting thereon, and, consequently, on the tail section of the aircraft.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 3a depicts a partial profile view of the tail skid wherein the cartridge assembly is broken away to reveal the internal components and arrangement thereof;

FIG. 3b is an exploded view of the cartridge assembly of FIG. 3a;

FIG. 5 depicts an alternate embodiment of the invention wherein a cylindrical cup member functionally replaces a centering member and activating sleeve of the cartridge assembly.

BEST MODE FOR CARRYING OUT THE INVENTION

Figure 1:
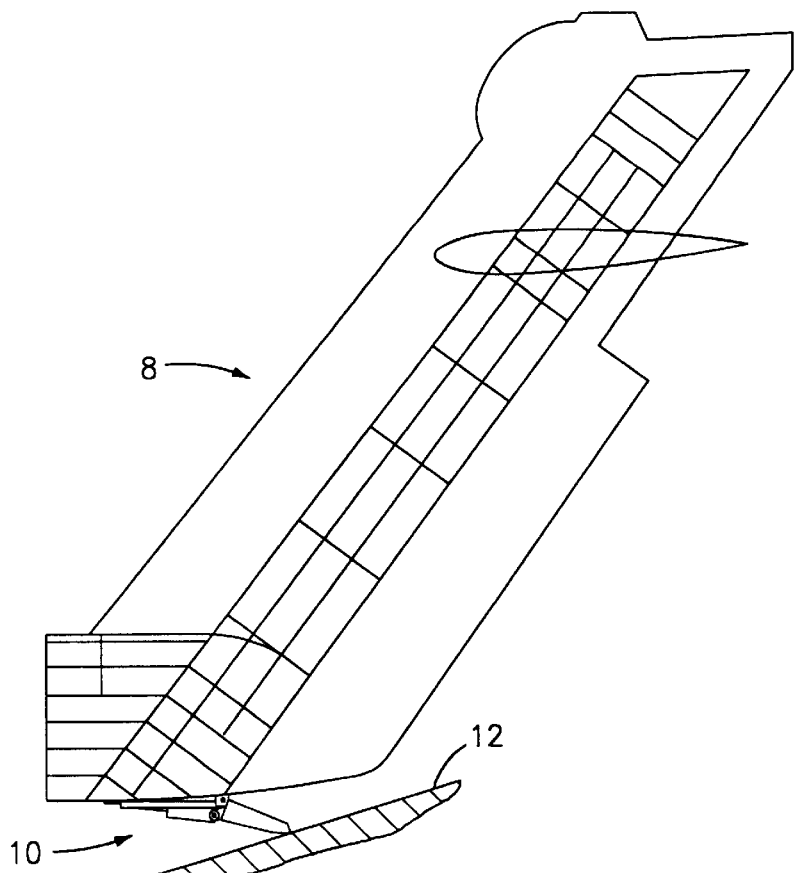
FIG. 1 depicts a side view schematic of a rotorcraft tail pylon having a tail skid according to the present invention mounted to the undercarriage thereof.

Referring now to the drawings wherein like reference characters identify corresponding or similar elements throughout the several views, FIG. 1 shows a rotorcraft tail pylon 8 having a tail skid 10 according to the present invention mounting to the undercarriage thereof. The tail skid 10 is operative to protect and limit the impact loads imposed on the tail pylon 8 during landing and, more particularly, during flared, i.e., nose-up, landing approaches wherein the tail pylon 8 is proximal to a landing surface 12. Furthermore, the tail skid 10 is operative to provide a visual indication of the magnitude of impact loads acting thereon, and, consequently, to the adjoining tail pylon 8.

Figure 2A:
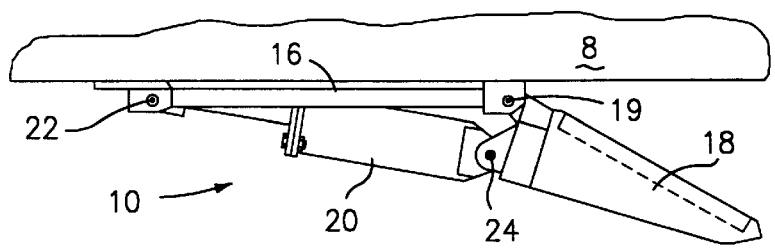
FIGS. 2a and 2b depict profile and bottom plan views of the tail skid including a mounting fixture, a contact arm disposed in pivotable combination with the mounting fixture, and a cartridge assembly mounting in combination with the mounting fixture and the contact arm.
Figure 2B:
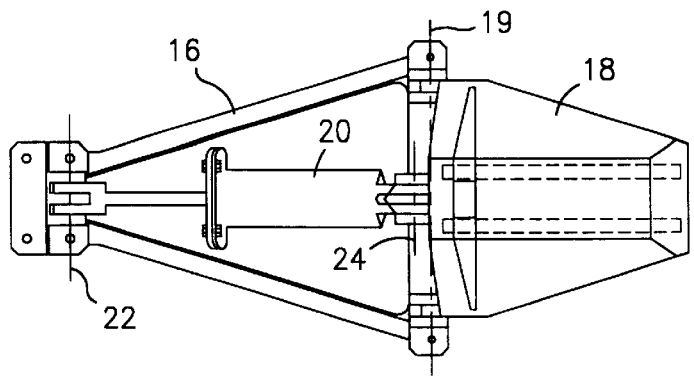

In FIGS. 2a and 2b, the tail skid 10 includes a mounting fixture 16 for securing the same to the undercarriage of the tail pylon 8, a contact arm 18, and a cartridge assembly 20. The contact arm 18 is disposed in pivotable combination with the mounting fixture 16 about a fulcrum axis 19 so as to permit rotational displacement in a response to impact loads acting on the landing gear/tail skid 10. The cartridge assembly 20 is disposed between and in pivotable combination with the mounting fixture 16 and the contact arm 18 about pivot axes 22 and 24, respectively, which are subject to relative motion by rotation of the contact arm 18. Depending upon the magnitude of impact loads acting on the contact arm 18, the cartridge assembly 20 is nonextensible when impact loads are below a threshold value, and is extensible when impact loads are at least equal to the threshold value. Before discussing the operating conditions which effect the kinematics of the tail skid 10, a detailed description of the cartridge assembly 20 is provided.

In FIGS. 3a and 3b, the cartridge assembly 20 includes a housing member 30 and a telescoping piston assembly 40 having end portions 30e and 40e, respectively, which are suitably configured for pivotally mounting to the contact arm 18 and the mounting fixture 16. More specifically, the housing member 30 is comprised of a cylindrically-shaped casing 34 and an end plate 36 which in combination define an internal chamber 38. The telescoping piston assembly 40 mounts within the internal chamber 38 and reciprocates therein in response to the relative motion of the pivot axes 22, 24. Furthermore, the piston assembly 40 comprises a through shaft 42 which is disposed in combination with a centering member 44, an activating sleeve 46 and a coil spring 48. Before discussing each element of the piston assembly 40, other components of the cartridge assembly 20 are described to impart a clear understanding of their interaction with the piston assembly 40.

The cartridge assembly 20 further includes an energy absorbing means 50 and an indication means 60 which are disposed within the internal chamber 38 intermediate opposed bearing surfaces 36s and 46s defined by the housing end plate 36 and the activating sleeve 46 of the piston assembly 40, respectively. The energy absorbing means 50 is preferably comprised of a material which is capable of reacting impact loads acting on the contact arm 18 which are below a threshold value and which absorbs and dissipates energy associated with impact loads equal to the threshold value. A more conventional term used in the art to describe such transition point is the crush strength of the material wherein applied loads which are equal to the crush strength results in plastic deformation of, and consequently, energy absorption within the material. In the described embodiment, the energy absorbing means 50 is a honeycomb core material having a crush strength of about 4400 lbs/in$^2$ (30.3×10$^6$N/m$^2$). Such honeycomb core materials may be purchased from Hexcell Corporation located in Dublin, Calif.

The indication means 60 includes an elongate stem 62 and an integrally formed flange 64 wherein a central bore 66 is formed therethrough. The stem 62 is slidably inserted through aligned apertures 52 and 70 formed in the energy absorbing means 50 and the housing end plate 36, respectively, such that the flange 64 is disposed in abutting combination with the energy absorbing means 50. Preferably, the elongate stem 62 is of sufficient length such that an end portion 62e thereof is substantially planar with a reference surface 36rs of the housing end plate 36.

The shaft 42 of the piston assembly 40 is disposed through the central bore 66 of the indication means 60 and is mechanically coupled to the centering member 44 by conventional means e.g., a threaded nut 49. The centering member 44 includes a peripheral surface 44p which is disposed in slidable combination with an internal pilot surface 30p of the housing member 30. The activating sleeve 46 is disposed over and co-axially aligned with the shaft 42 and interposed between the centering member 44 and the flange 64 of the indication means 60. Accordingly, the various components, i.e., the centering member 44, the activating sleeve 46, the indication means 60 and the energy absorbing means 50 are disposed about the piston assembly shaft 42 in abutting combination.

Figure 4A:
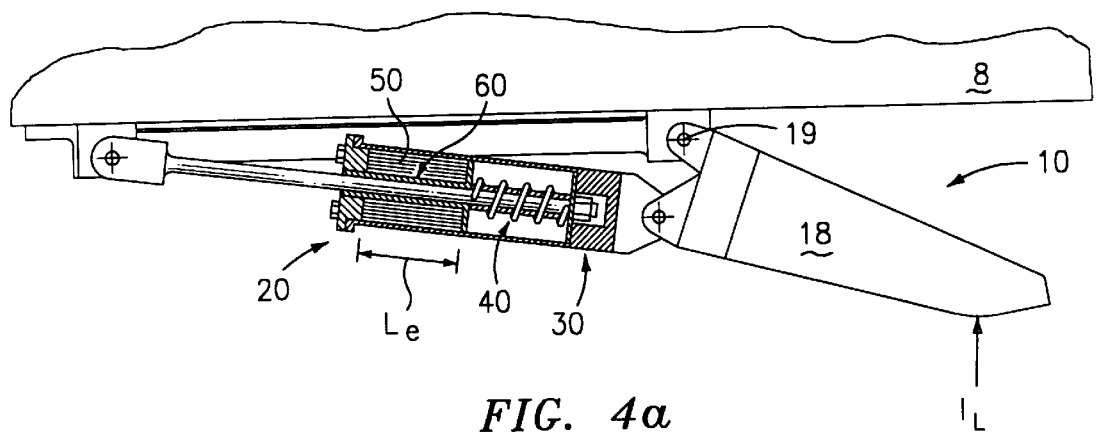
FIGS. 4a–4c depict the tail skid in normal and energy absorbing operating modes including a means for indicating the magnitude of impact loading acting on the tail skid and adjoining tail pylon.
Figure 4B:
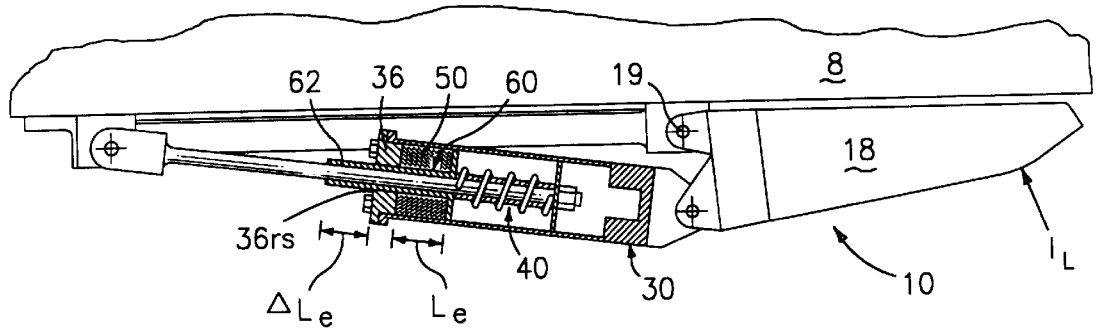

In FIGS. 4a and 4b, the tail skid 10 is shown in normal and energy absorbing modes of operation. The normal and energy absorbing operating modes are defined in terms of impact loads $I_L$ applied to the contact arm 18 which are below, or at least equal to a threshold value. The structural capacity of the tail pylon 8 determines the magnitude of the threshold value which may be further defined as the limit load above which structural damage to the tail pylon 8 may occur. The import and significance of the threshold value will become apparent in view of the following discussion.

In the normal operating mode (see FIG. 4a), the impact loads $I_L$ are below the threshold value and the tail skid 10 functions as a conventional bumper assembly for protecting the undercarriage of the tail pylon 8. In this operating mode, the impact loads $I_L$ acting on the contact arm 18 are coupled to the energy absorbing means 50 through the opposed bearing surfaces 36s, 46s (see FIG. 3a). The impact loads $I_L$ imposed on the cartridge assembly 20 via the contact arm 18 are less than the crush strength of the energy absorbing means 50; hence, the energy absorbing means 50 reacts the impact loads $I_L$ without change to its critical dimension Lc, i.e., length. Accordingly, the cartridge assembly 20 functions as a rigid link and prevents rotational displacement of the contact arm 18 about its fulcrum axis 19. Furthermore, the position of the indication means 60 relative to the housing member 30 remains unchanged. The impact loads $I_L$ are transferred to the tail pylon 8 and reacted by the internal support structures thereof, e.g., stringers, longerons, bulkheads, etc.

In the energy absorbing mode (see FIG. 4b), the impact loads $I_L$ are at least equal to the threshold value. In this mode, the tail skid 10 absorbs and dissipates all or a portion of the impact loads $I_L$ thereby abating or mitigating structural damage to the tail pylon 8. More specifically, the impact loads $I_L$ acting on the contact arm 18 effect plastic deformation of the energy absorbing means 50, i.e., change the critical dimension $L_c$ thereof, thereby effecting extension of the cartridge assembly 20 and rotation of the contact arm 18 about its fulcrum axis 19. The energy absorbing means 50 absorbs and dissipates the energy of the impact loads $I_L$ provided, however, that the maximum deformable length thereof has not been exceeded. Preferably, the energy absorbing means 50 deforms in a uniform manner to maintain the impact load $I_L$ at a constant level, i.e., at the threshold value, thereby maximally protecting the tail pylon 8.

Concomitantly, the indication means 60, which is disposed in combination with the energy absorbing means 50, will be displaced by an amount $\Delta_{LC}$ equal to change in critical dimension Lc, or plastic deformation of the energy absorbing means 50. Accordingly, the elongate stem 62 will protrude beyond the reference surface 36rs to provide a visual Indication that the magnitude of the impact loads $I_L$, has reached the threshold value. Preferably, an indicium 80 is placed on the elongate stem 62 (see FIG. 3b) to provide a further indication that the energy absorbing means 50 has been fully deformed.

The indication means 60 provides a visual cue to aircraft maintenance personnel that the cartridge assembly 20 has been exercised, and that damaging loads may have been applied to the tail pylon 8 and/or the tail skid 10. If the elongate stem 62 is extended to a position wherein the indicium 80 is not yet visible, i.e., beyond the reference surface 36rs, the operator may conclude that the tail pylon has not been subject to damaging loads. That is, the magnitude of the impact loads $I_L$ have reached, but not exceeded, the threshold value, hence the load levels transmitted to the tail pylon 8 are non-damaging. In this circumstance, the operator will replace the energy absorbing means 50 to ready the cartridge assembly 20 for subsequent use. Should the elongate stem 62 protrude to a position wherein the indicium 80 is visible, i.e., past the reference surface 36rs, it may be concluded that the tail pylon 8 and/or tail skid 10 has been subject to damaging loads and that a vigorous inspection of each should be performed. That is, since the energy absorbing means 50 has been maximally deformed, it should be assumed that higher loads, i.e., loads above the threshold value, were transmitted to the tail pylon 8 and that repair and maintenance may be required.

Figure 4C:
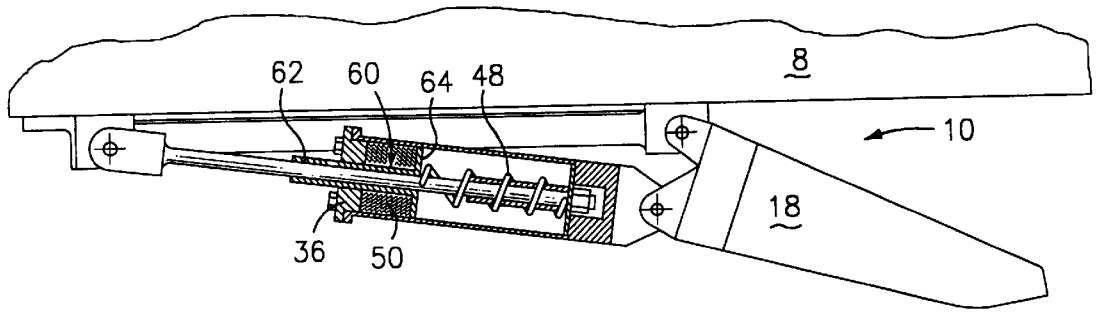

In FIG. 4c, the coil spring 48 maintains a steady force on the flange 64 of the indication means 60 to ensure that elongate stem 62 remains in its extended position after impact. That is, the spring 48 prevents the indication means 60 from backing-out or becoming dislodged from its position relative to the energy absorbing means 50, and consequently, to the housing end plate 36.

In the described embodiment, the threshold value is about 4,000 lbs (17793 N), and the crush strength of the energy absorbing means 50, is about 4400 lbs/in$^2$ (30.3×10$^6$ N/m$^2$). However, it will be appreciated that such design criteria and material properties will vary depending on mission specifications, e.g., survivable sink rate, and the materials employed in the fabrication of the tail pylon 8 and tail skid 10. Furthermore, the requisite crush strength of the energy absorbing means 50 is a function of the specific geometry of the tail skid 10 which will vary, for example, based upon the length of the contact arm 18, the distance between the fulcrum and mounting axes 19, 24 thereof, and the size of the housing member.

As discussed in the Background of the Invention, prior art landing is gear assemblies provide a full or marginal level of protection depending upon the mission requirement. Energy absorbing landing gear, which provide a full level of protection, are typically designed for military rotorcraft wherein a relatively high level of impact loading is expected, albeit, infrequently. Furthermore, the tail pylon is reinforced to withstand the anticipated higher loads. Skid landing gear/tail skids, which provide a marginal level of protection, may be utilized in civil rotorcraft wherein ground contact is not anticipated, yet a marginal degree of protection is, nonetheless, desired. Based on a comparison between civil and military variants of the same rotorcraft configuration, the tail pylon of the civil variant may be substantially lighter than that of the military version, but will not have the requisite strength to perform military missions.

The tail skid 10 of the present invention provides an intermediate level of protection which permits the use of a tail pylon 8 which is comparable in strength and weight to that of a civil rotorcraft, but which has utility in military variants thereof. The tail skid 10 provides dual modes of operation which are functionally equivalent an energy absorbing landing gear and a tail skid. Furthermore, the tail skid 10 includes an indication means 60 to inform the operator/maintenance personnel that inspection and repair may be required. The energy absorbing means 50 provides additional damage tolerance, i.e., beyond that of a conventional tail skid, while the indication means 60 provides additional information with respect to the applied impact loads $I_L$. The proper use of such information assures that the rotorcraft is operated safety within its structural limits.

By reducing weight in the tail pylon 8, rotorcraft handling qualities and fuel efficiency are improved. With respect to the former, the lightened tail pylon 8 reduces the mass moment of inertia about the rotorcraft pitch axis, hence the rotorcraft is more agile and easier to maneuver. Regarding the latter, it is well known that even small weight savings on rotorcraft, on the order of several pounds, can result in substantial fiscal savings by reduced fuel consumption. Cost benefits are also derived from the commonality of tooling and inventory which reduces fixed costs, and, consequently, fixed overhead.

The present invention has been described in terms of a tail skid 10, however, it will be apparent that the teachings thereof are equally applicable to a landing gear wherein support of the tail pylon 8 is additionally desired. When used as a landing gear, the contact arm 18 may be elongated, and/or other components suitably sized, to accommodate the increased ground clearance typically required for such applications.

In the described embodiment, the pivot axes 22, 24 of the tail skid 10 move spatially apart, thereby requiring extension of the cartridge assembly 20. However, it will be apparent that the teachings of the present invention are equally applicable to in-line or other landing gear configurations wherein the axes or pivot axes move spatially together. In such embodiment, the cartridge assembly would be collapsible and the piston assembly would force the elongate stem through a second aperture of the housing member which is disposed in opposed relation to a first aperture which accepts the piston assembly shaft.

While the energy absorbing means 50 is preferably a crushable honeycomb core material, other materials and/or energy absorbing apparatus may be substituted therefor. For example crushable metal foams or frangible tubing such as available from Alcan International LTD., located in Ontario, Canada may be employed for absorbing and dissipating the energy associated with impact loads.

While the indication means 60 has been described in terms of an elongate stem 62 and integral flange 64, it will be appreciated that other embodiments are contemplated. For example, the indication means 60 may comprise a transparent window formed in combination with the housing member wherein the deformation of the energy absorbing means may be observed. Furthermore, the elongate stem 62 need not be disposed in coaxial relation to the piston assembly shaft, but may be disposed through a secondary aperture formed in the housing member and/or the energy absorbing means In the described embodiment, the indicium 80 on the elongate stem 62 provides a visual indication through a digital-type response, i.e., yes or no regarding the exceedance of the threshold impact load, however, an indication of an analog nature may be provided. For example, the energy absorbing material may vary in density, i.e., crush strength, along its length to react increasingly larger impact loads as the contact arm 18 rotates about its fulcrum axis 19. Accordingly, indicia on the elongate stem 62 may be used to indicate increasing load levels, to provide a rough-order-of-magnitude of the applied impact load.

While the piston assembly 40 of the present invention includes a centering member 44 to pilot the shaft 42 within the housing member 30 and an activating sleeve 46 to bear against the indication means 60, it will be appreciated that an integral structure may perform both functions. For example, an open-ended cylindrical cup 90 as seen in FIG. 5 may be employed wherein the peripheral surfaces 92 of the cup guide the shaft within the housing member and wherein the end portion defines a bearing surface 94 for engaging the flange of the indication means. In this embodiment, the coil spring 48 is disposed internally of the cup 92 to prevent the indication means from being dislodged after the energy absorbing means has been deformed.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A landing gear/tail skid (10) having at least two pivot axes (22, 24) subject to relative motion in response to impact loads acting on the landing gear/tail skid (10), and including:

a cartridge assembly (20) including:
    a housing member (30) having an internal chamber (38) and an end portion (30e) disposed in combination with one of the pivot axes (22, or 24);
    a telescoping piston assembly (40) mounted within said internal chamber (38) of said housing member (30) and having an end portion (40e) disposed in combination with the other of the pivot axes (22, or 24);
    said housing member (30) and telescoping piston assembly (40), in combination, defining opposed bearing surfaces (36s, 46s);
the landing gear/tail skid (10) being characterized by:
    energy absorbing means (50) having a critical dimension ($L_c$) and disposed within the internal chamber (38) intermediate the opposed bearing surfaces (36s, 46s);
    said energy absorbing means (50) operative, in response to impact loads coupled thereto by said opposed bearing surfaces (36s, 46s), for reacting impact loads below a threshold value without change in said critical dimension ($L_c$);
    said energy absorbing means (50) being further operative, in response to impact loads coupled thereto by the opposed bearing surfaces (36s, 46s), for absorbing and dissipating energy of impact loads at least equal to said threshold value by changes in said critical dimension ($L_c$); and
    indication means (60) for visually indicating changes in said critical dimension ($L_c$) of said energy absorbing means (50);
    said changes in said critical dimension ($L_c$) being indicative of the magnitude of the impact loads imposed on the landing gear/tail skid (10);
wherein the housing member (30) includes a reference surface (36rs), and wherein the housing member (30) and said energy absorbing means (50) include aligned apertures (52, 70), and wherein said indication means (60) includes an elongate stem (62) and an integrally formed flange (64), said elongate stem (62) being disposed through said aligned apertures (52, 70) and said flange (64) being disposed in combination with said energy absorbing means (50), said elongate stem (62) protruding beyond said reference surface (36rs) of said housing member (30) in response to said change in critical dimension ($L_c$) of said energy absorbing means (50).

2. The landing gear/tail skid (10) according to claim 1 wherein said changes in said critical dimension ($L_c$) of said energy absorbing means (50) define a maximum deformation, and wherein an indicium (80) on said elongate stem (62) is indicative of said maximum deformation to provide an indication that said threshold value has been exceeded when said indicium (80) is visible.

3. The landing gear/tail skid (10) according to claim 1 wherein said indication means (60) includes a central bore (66) formed through said elongate stem (62) and said integrally formed flange (64), wherein the housing member (30) includes an internal pilot surface (30p), and wherein the telescoping piston assembly (40) includes:

a shaft (42) extending through said central bore (66);

a centering member (44) mechanically coupled to said shaft (42) and having a peripheral surface (44p) disposed in slidable combination with said internal pilot surface (30p) of the housing member (30);

an activating sleeve (46) disposed over and coaxially aligned with respect to said shaft (42), and furthermore interposed between said centering member (44) and said indication means (60), said activating sleeve (46), furthermore, defining the opposed bearing surface (46s) of the piston assembly (40).

4. The landing gear/tail skid (10) according to claim 3 including a coil spring (48) interposed between and abutting said centering member (44) and said flange (64) for maintaining the position of said indication means (60) relative to said reference surface (36rs) of said housing member (30).

5. A landing gear/tail skid (10) for protecting and limiting the impact loads acting on the tail section of an aircraft, including:

a mounting fixture (16) for securing the landing/gear tail skid (10) to the aircraft tail section;

a contact arm (18) disposed in pivotable combination with the mounting fixture (16) about a fulcrum axis (19), the contact arm (18) rotating about the fulcrum axis (19) in response to impact loads acting on the landing gear/tail skid (10);

the mounting fixture (16) and contact arm (18) defining pivot axes (22, 24) which are subject to relative motion in response to rotational displacement of the contact arm (18); and a cartridge assembly (20) including:

a housing member (30) having an internal chamber (38), a reference surface (36rs), and an end portion (30e) disposed in combination with one of the pivot axes (22, or 24);

a telescoping piston assembly (40) mounted within the internal chamber (38) of the housing member (30) and having an end portion (40e) disposed in combination with the other of the pivot axes (22, or 24);

the housing member (30) and telescoping piston assembly (40), in combination, defining opposed bearing surfaces (36s, 46s);

the landing gear/tail skid (10) being further characterized by:

energy absorbing means (50) having a critical dimension ($L_c$) and disposed within the internal chamber (38) intermediate the opposed bearing surfaces (36s, 46s);

the energy absorbing means (50) operative, in response to impact loads coupled thereto by the opposed bearing surfaces (36s, 46s), for reacting impact loads below a threshold value without change in said critical dimension ($L_c$);

said energy absorbing means (50) being further operative, in response to impact loads coupled thereto by the opposed bearing surfaces (36s, 46s), for absorbing and dissipating energy of impact loads at least equal to said threshold value by changes in said critical dimension ($L_c$);

the housing member (30) and the energy absorbing means (50) including aligned apertures (52, 70); and indication means (60) including an elongate stem (62) and an integrally formed flange (64), said elongate stem (62) being disposed through said aligned apertures (52, 70) and said flange (64) being disposed in combination with said energy absorbing means (50), said elongate stem (62) protruding beyond said reference surface (36rs) of the housing member (30) in response to said changes in critical dimension ($L_c$) of said energy absorbing means (50);

said changes in said critical dimension ($L_c$) being indicative of the magnitude of the impact loads imposed on the landing gear/tail skid (10).

6. A cartridge assembly (20) for use in combination with a landing gear/tail skid (10) having at least two pivot axes, (22, 24) which are subject to relative motion in response to impact loads acting on the landing gear/tail skid (10), the cartridge assembly (20) including:

a housing member (30) having an internal chamber (38) and an end portion (30e) disposed in combination with one of the pivot axes (22, or 24);

a telescoping piston assembly (40) mounted within said internal chamber (38) of said housing member (30) and having an end portion (40e) disposed in combination with the other of the pivot axes (22, or 24);

said housing member (30) and telescoping piston assembly (40), in combination, defining opposed bearing surfaces (36s, 46s);

the cartridge assembly (2) being characterized by:

energy absorbing means (50) having a critical dimension ($L_c$) and disposed within the internal chamber (38) intermediate the opposed bearing surfaces (36s, 46s);

said energy absorbing means (50) operative, in response to impact loads coupled thereto by the opposed bearing surfaces (36s, 46s), for reacting impact loads below a threshold value without change in said critical dimension ($L_c$);

said energy absorbing means (50) being further operative, in response to impact loads coupled thereto by the opposed bearing surfaces (36s, 46s), for absorbing and dissipating energy of impact loads at least equal to said threshold value by changes in said critical dimension ($L_c$); and indication means (60) for visually indicating changes in said critical dimension ($L_c$) of said energy absorbing means (50);

said changes in said critical dimension ($L_c$) being indicative of the magnitude of the impact loads acting on the landing gear/tail skid (10)

wherein the housing member (30) includes a reference surface (36rs), and wherein the housing member (30) and said energy absorbing means (50) include aligned apertures (52, 70), and wherein said indication means (60) includes an elongate stem (62) and an integrally formed flange (64), said elongate stem (62) being disposed through said aligned apertures (52, 70) and said flange (64) being disposed in combination with said energy absorbing means (50), said elongate stem (62) protruding beyond said reference surface (36rs) of said housing member (30) in response to said change in critical dimension ($L_c$) of said energy absorbing means (50).

7. The landing gear/tail skid (10) according to claim 6 wherein said changes in said critical dimension ($L_c$) of said energy absorbing means (50) define a maximum deformation, wherein an indicium (80) on said elongate stem (62) is indicative of said maximum deformation to provide an indication that said threshold value has be en exceeded when said indicium (80) is visible.

8. The cartridge assembly (20) according to claim 6 wherein said indication means (60) includes a central bore

(66) formed through said elongate stem (62) and said integrally formed flange (64), wherein the housing member (30) includes an internal pilot surface (30p), and wherein the telescoping piston assembly (40) includes:

- a shaft (42) extending through said central bore (66);
- a centering member (44) mechanically coupled to said shaft (42) and having a peripheral surface (44p) disposed in slidable combination with said internal pilot surface (30p) of the housing member (30);
- an activating sleeve (46) disposed over and coaxially aligned with respect to said shaft (42), and furthermore interposed between said centering member (44) and said indication means (60), said activating sleeve (46), furthermore, defining the opposed bearing surface (46s) of the piston assembly (40).

9. The cartridge assembly (20) according to claim 7 including a coil spring (48) interposed between and abutting said centering member (44) and said flange (64) for maintaining the position of said indication means (60) relative to said reference surface (36rs) of the housing member (30).

\* \* \* \* \*